Jan. 27, 1925.
M. D. MANN, JR
1,524,192
METHOD FOR DEHYDRATING ORGANIC LIQUIDS
Filed May 24, 1922
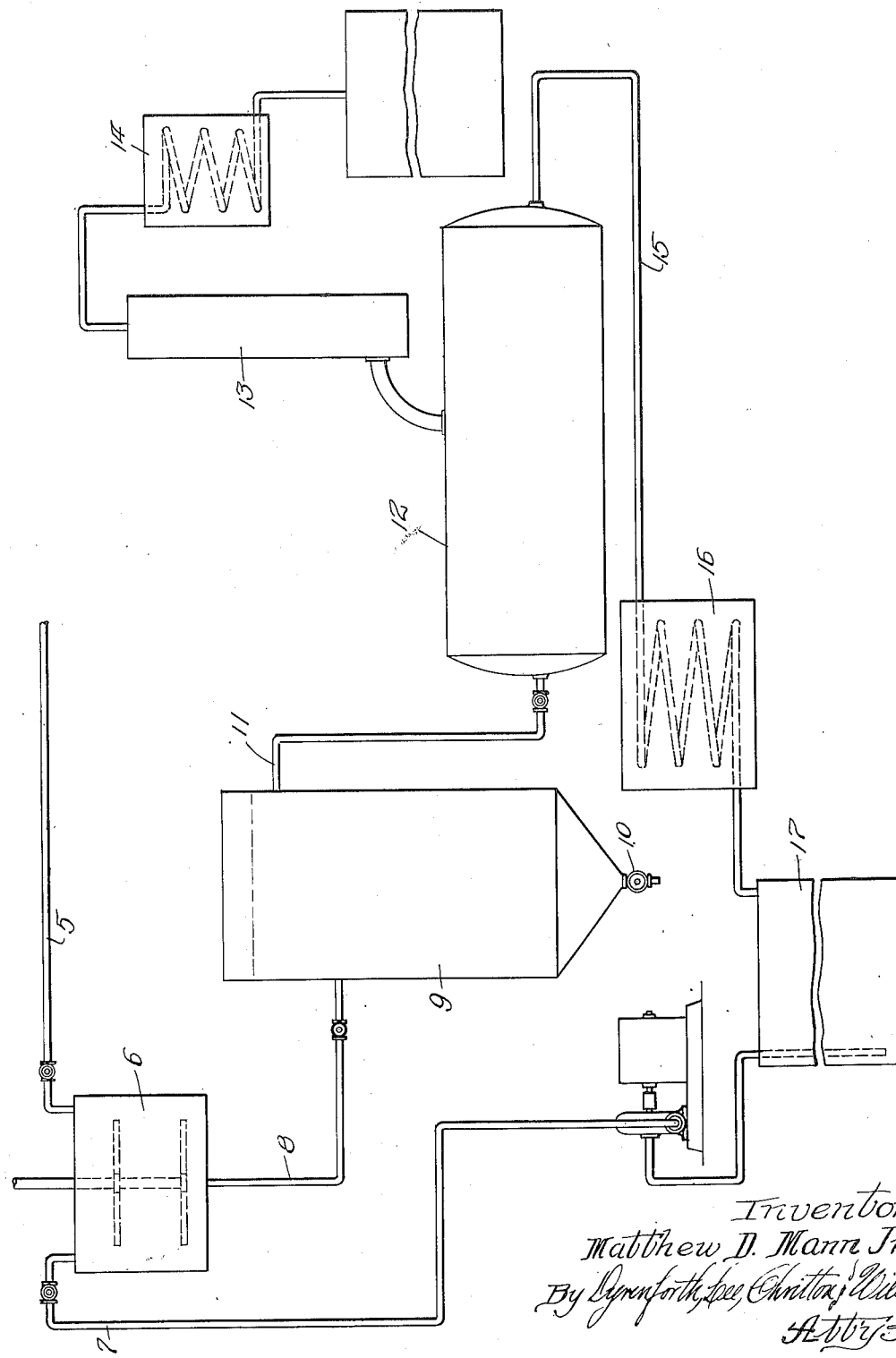

Patented Jan. 27, 1925.

1,524,192

UNITED STATES PATENT OFFICE.

MATTHEW D. MANN, JR., OF ROSELLE, NEW JERSEY, ASSIGNOR TO STANDARD DEVELOPMENT COMPANY, A CORPORATION OF DELAWARE.

METHOD FOR DEHYDRATING ORGANIC LIQUIDS.

Application filed May 24, 1922. Serial No. 563,390.

*To all whom it may concern:*

Be it known that I, MATTHEW D. MANN, Jr., a citizen of the United States, residing at Roselle, in the county of Union and State of New Jersey, have invented new and useful Improvements in Methods for Dehydrating Organic Liquids, of which the following is a specification.

The present invention relates to improvements in methods for dehydrating organic liquids and more particularly of organic liquids miscible with mineral oils and having at least a partial miscibility with water, for example, secondary butyl alcohol, ethyl acetate, propyl acetate and the like. In the subsequent description of operations, secondary butyl alcohol will be specifically referred to, although it is to be understood that other liquids of similar characteristics, as above set forth, may be subjected to the same treatment.

The liquid to be dehydrated, which may be, for example, secondary butyl alcohol containing about 23% of water, is mixed with a hydrocarbon oil having a high initial boiling-point, preferably above 325° F. For example, gas oil, having an initial boiling point of 350° F., mineral seal oil, having an initial boiling pont of 405° F., or a heavier lubricating oil may be used. The mixture of the alcohol and oil is run to a suitable tank, in which a layer separation occurs. The upper layer contains oil and alcohol with a small amount of water and the lower layer contains water and a small amount of alcohol. The two layers are separately drawn off and the lower layer may, if desired, be concentrated by rectification. The oil containing admixed alcohol is run into a suitable still, preferably provided with a dephlegmating column of any suitable type, high efficiency of dephlegmation not being of importance. A separation of the oil and the admixed alcohol is readily effected by distillation in such a still, there being a very wide gap between the boiling-point of the alcohol and the initial boiling-point of the oil.

The extent of dehydration may be controlled within wide limits by the proportion of oil used. For example, with secondary butyl alcohol containing about 23% of water as described, the use of an equal volume of oil will result in a dehydrated alcohol product containing approximately 5% of water. If 10 volumes of oil are used for each volume of the water-containing alcohol, the alcohol product will contain not more than 1% of water. Intermediate proportions of oil will result in dehydrated alcohol products containing intermediate proportions of alcohol.

In the accompanying drawing apparatus suitable for carrying the invention into effect in continuous operation is illustrated in a somewhat diagrammatic manner. The alcohol to be dehydrated is fed through line 5 into a mixing device 6, into which the oil is fed through line 7. The mixture of oil and alcohol passes through line 8 into settling tanks 9. Here the layer separation of the mixture of alcohol and oil from the dilute solution of alcohol in water takes place, the latter being withdrawn intermittently or continuously, as desired, through the valved pipe 10 at the bottom of the settling tank. From a suitable overflow pipe 11 the mixture of alcohol and oil passes out of the settling tank into the still 12, the vapor line of which is provided with a reflux column or dephlegmator 13. The vapors issuing from the dephlegmator are passed through the condenser 14, the oil residue from the still passing out through pipe 15 through a suitable cooler 16 into a tank 17. From the tank it may be pumped as required into the line 7 feeding into the mixer 6.

As has been previously stated, the present process is applicable to dehydration of other liquids miscible with oil and having at least a partial miscibility with water, such as ethyl acetate, propyl acetate, and the like. It will be understood, of course, that the use of the term secondary butyl alcohol in the following claims is intended to cover also such equivalent materials.

I claim:

1. The method of dehydrating secondary butyl alcohol which consists in admixing therewith a mineral oil of materially higher boiling point, separating off the layer of admixed alcohol and oil and distilling off the alcohol from said mixture.

2. The method of dehydrating secondary butyl alcohol which consists in admixing therewith a mineral oil having a boiling-point above 325° F., settling the mixture, removing the separated layer of alcohol and oil and distilling the alcohol therefrom.

3. The method of dehydrating secondary butyl alcohol which consists in continuously flowing alcohol and admixed mineral oil of materially higher boiling point into a receptacle, permitting the mixture to settle therein, separately withdrawing the oil and alcohol layer and the water layer, distilling off the alcohol from the oil-alcohol layer and admixing the residual oil with fresh alcohol entering the process.

MATTHEW D. MANN, Jr.